(12) United States Patent
Dai et al.

(10) Patent No.: US 10,146,895 B2
(45) Date of Patent: Dec. 4, 2018

(54) METHOD AND APPARATUS FOR SIMULATING A DIGITAL CIRCUIT

(71) Applicant: INTERNATIONAL BUSINESS MACHINES CORPORATION, Armonk, NY (US)

(72) Inventors: Hongwei Dai, Shanghai (CN); Gongqiong Li, Shanghai (CN); Jia Niu, Shanghai (CN); Zhenrong Shi, Shanghai (CN); Lei Wang, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 597 days.

(21) Appl. No.: 14/524,413

(22) Filed: Oct. 27, 2014

(65) Prior Publication Data

US 2015/0120268 A1  Apr. 30, 2015

(30) Foreign Application Priority Data

Oct. 31, 2013 (CN) .......................... 2013 1 0530202

(51) Int. Cl.
G06F 17/50 (2006.01)

(52) U.S. Cl.
CPC ...... G06F 17/5031 (2013.01); G06F 17/5022 (2013.01); G06F 2217/78 (2013.01); G06F 2217/84 (2013.01)

(58) Field of Classification Search
CPC ............. G06F 17/5031; G06F 17/5022; G06F 2217/78; G06F 2217/84

(Continued)

(56) References Cited

U.S. PATENT DOCUMENTS 5,625,803 A * 4/1997 McNelly ............. G06F 17/5022
                                                           703/14
5,768,145 A * 6/1998 Roethig .............. G06F 17/5022
                                                           703/14

(Continued)

FOREIGN PATENT DOCUMENTS

| CN | 102169515 | 8/2011 |
| CN | 102314525 | 1/2012 |
| CN | 102799698 | 11/2012 |

OTHER PUBLICATIONS

SDF_2001 (1497 IEEE Standard for Standard Delay Format (SDF) for the Electronic Design Process, IEEE Std 1497—20001, Dec. 14, 2001).*

(Continued)

*Primary Examiner* — Brian S Cook
(74) *Attorney, Agent, or Firm* — David Cain; Andrews M. Claderon; Roberts Mlotkowski Safran Cole & Calderon, P.C.

(57) ABSTRACT

The present invention discloses a method for simulating a digital circuit comprising: acquiring a gate-level netlist of the digital circuit, the gate-level netlist indicating at least one gate circuit included in the digital circuit and a connection relationship thereof; modifying the netlist, so as to add a timing and power model of each gate circuit, which is used to calculate a time delay generated when a signal inputted to the gate circuit passes through the gate circuit and a power consumed by the gate circuit during its operation; and simulating the digital circuit based on the modified netlist. By adding into the netlist the timing and power model of each gate circuit included in the digital circuit, a power estimation of the digital circuit can be performed while a function verification is performed on the digital circuit, thus function verification is seamlessly combined with the power estimation.

16 Claims, 4 Drawing Sheets

(58) Field of Classification Search
USPC .......................................................... 703/14
See application file for complete search history.

(56) References Cited

U.S. PATENT DOCUMENTS

| | | | | |
|---|---|---|---|---|
| 6,457,159 | B1* | 9/2002 | Yalcin | G06F 17/5022 716/104 |
| 6,807,660 | B1* | 10/2004 | Frenkil | G06F 17/5022 716/109 |
| 7,240,304 | B2 | 7/2007 | Dutta et al. | |
| 8,205,187 | B1* | 6/2012 | Coelho | G06F 17/5022 703/16 |
| 8,286,112 | B2 | 10/2012 | Miranda et al. | |
| 8,407,654 | B2 | 3/2013 | Buechner et al. | |
| 8,566,767 | B1* | 10/2013 | Kukal | G06F 17/5031 703/13 |
| 2002/0032555 | A1* | 3/2002 | Suwada | G06F 17/5036 703/14 |
| 2002/0042704 | A1* | 4/2002 | Najm | G06F 17/5036 703/14 |
| 2002/0144214 | A1* | 10/2002 | Rao | G06F 17/5036 716/108 |
| 2004/0243373 | A1 | 12/2004 | Sercu et al. | |
| 2008/0103710 | A1* | 5/2008 | Wegener | H03M 7/30 702/66 |
| 2008/0133202 | A1* | 6/2008 | Tseng | G06F 17/5036 703/14 |
| 2008/0281574 | A1* | 11/2008 | Bazinet | G06F 17/5022 703/18 |
| 2009/0106720 | A1* | 4/2009 | Nagata | G06F 17/5031 716/113 |
| 2009/0241081 | A1* | 9/2009 | Smith | G06F 17/5031 716/113 |
| 2009/0271167 | A1* | 10/2009 | Zhu | G06F 17/5027 703/14 |
| 2010/0286974 | A1 | 11/2010 | Sundaresan et al. | |
| 2012/0216160 | A1 | 8/2012 | Buechner et al. | |
| 2013/0054202 | A1 | 2/2013 | Carlsen et al. | |
| 2015/0227661 | A1* | 8/2015 | Sasaki | G06F 17/5022 703/15 |

OTHER PUBLICATIONS

TLF_2000 (Timing Library Format Reference, Product Version 4.3, Oct. 2000 Cadence Design System, Inc.).*
Kawakami_2000 (Yoshiyuki Kawakami et al., Gate-Level Aged Timing Simulation Methodology for Hot-Carrier Reliability Assurance, Proceedings of the ASP-DAC 2000, pp. 289-294, Jan. 2000).*
Calc_2005 (Waveform Calculator User Guide, Cadence Product Version 5.1.41, Dec. 2005).*
Kumar_2013 (Selective Glitch Reduction Technique for Minimizing Peak Dynamic IR Drop, Microelectronics and Solid State Electronics Feb. 4, 2013, 2(2A): 27-32).*
Peng_2010 (Emulating and Diagnosing IR-Drop by Using Dynamic SDF, IEEE 2010).*
Dhanwada_2009 (Simultaneous Exploration of Power, Physical Design and Architectural Performance Dimensions of the SoC Design Space using SEAS, D&R Industry Articles Dec. 17, 2009).*
Boolean algebra defined Wikipedia dated Sep. 2013.*
Synopsys, Cadence, Power Estimation and Optimization; Low Power Design Flow, RuChip Design Flow, Dec. 2012, 19 Pages.
Lee, Je-Hoon, Kim, Sang-Choon, Kim,Young Hwan, Cho Kyoungrok; Efficient co-simulation framework enhancing system-level power estimation for a platform-based SoC design. Microelectronics Journal 42, pp. 1290-1298, Sep. 22, 2011.
Ahuja, Sumit, High level Power Estimation and Reduction Techniques for Power Aware Hardware Design, Dissertation submitted to the Faculty of the Virginia Polytechnic Institute & State University . May 12, 2010 , 1-144pages.
Alexander, Jins Davis, Thesis Abstract, Simulation Based Power Estimation for Digital CMOS Technologies, Master of Science, Dec. 19, 2008, (B. Tech., National Institute Technology of Calicut, 2003) pp. 1-87.

* cited by examiner

METHOD AND APPARATUS FOR SIMULATING A DIGITAL CIRCUIT

BACKGROUND

The present invention relates to a field of electronic design automation, and more specifically, to a method and apparatus for simulating a digital circuit.

In a circuit design field, after design of a digital circuit is completed, function verification can be performed on the digital circuit through simulation, so as to determine whether it can achieve a desired function. On the other hand, the digital circuit will consume a power during its operation. For example, a complementary metal oxide semiconductor (CMOS) digital circuit will consume a power including a static power and a dynamic power during its operation. The static power includes leakage power, and the dynamic power includes a switching power and a short-circuit power, where the switching power can be further divided into a functional power and a glitch power. When a signal inputted to the digital circuit is switched between 0 and 1 in each clock cycle, the functional power will be consumed. Furthermore, when the signal is switched between 0 and 1, waveform glitches may occur at outputs of respective gate circuits in the digital circuit due to transmission delays of the respective gate circuits, thereby the glitch power is consumed. If a total power of the digital circuit consumed during its operation is too large, or the glitch power caused by, for example, the transmission delays of the gate circuits is too large, the digital circuit may not be put into practical use. Therefore, before manufacturing of the designed digital circuit, a power estimation is required to be performed on the designed digital circuit in addition to the function verification.

It is difficult to perform the power estimation on the digital circuit, and an accurate power estimation generally requires a lot of simulations. Although some vectorless power estimation methods and research tools have been proposed to estimate the power of the digital circuit, such methods and tools have limited accuracy and are only applicable to small-scale circuit designs, not industrial circuit designs. Currently, a simulation-based power estimation method is more widely used. In this method, firstly, the digital circuit is simulated and an acquired waveform is recorded, then power consumed by the digital circuit is calculated based on the waveform and switching activity information of an excitation signal for the digital circuit. In the meantime, in order to make the simulation more realistic, detailed timing information of the digital circuit, including transmission delays of gate circuits and wires, is determined by means of static timing analysis (STA) before the simulation and is stored in a file in a standard delay format (SDF) in advance, and during the simulation, the SDF file is read and the simulation is performed based on the timing information recorded in the file.

However, the simulation-based power estimation method has many disadvantages. Firstly, in this method, the function verification and the determination of the timing information are performed separately, that is to say, the timing information of the digital circuit cannot be acquired while the function verification (simulation) is being performed, which reduces efficiency of the digital circuit design. Moreover, as known in the art, there are multiple paths between respective input port and output port of the digital circuit; however, in this method, the timing information stored in the SDF file is only for a critical path (slowest signal transmission path), not for the other paths (non-critical paths), therefore, the simulation based on the SDF file actually uses inaccurate timing information so that the power cannot be accurately estimated. In particular, since an accurate estimation of the glitch power (which is often 20%-40% of the dynamic power) requires very accurate timing information, the timing information stored in the SDF file cannot meet such requirement, thus the glitch power cannot be accurately estimated.

SUMMARY

An object of the present invention is to provide a method and apparatus for simulating a digital circuit, which can perform power estimation while performing function verification on the digital circuit, so as to seamlessly combine the function verification with the power estimation to improve an efficiency of a digital circuit design.

According to an aspect of the present invention, there is provided a method for simulating a digital circuit, comprising: acquiring a gate-level netlist of the digital circuit, which indicates at least one gate circuit included in the digital circuit and a connection relationship thereof; modifying the gate-level netlist, so as to add, in the gate-level netlist, a timing and power model of each gate circuit for calculating a time delay generated when a signal inputted to the gate circuit passes through the gate circuit (i.e., transmission delay of the gate circuit) and a power consumed by the gate circuit during its operation; and simulating the digital circuit based on the modified gate-level netlist.

According to another aspect of the present invention, there is provided an apparatus for simulating a digital circuit, comprising: a netlist acquisition device, configured to acquire a gate-level netlist of the digital circuit, which indicates at least one gate circuit included in the digital circuit and a connection relationship thereof; a netlist modification device, configured to modify the gate-level netlist, so as to add, in the gate-level netlist, a timing and power model of each gate circuit for calculating a time delay generated when a signal inputted to the gate circuit passes through the gate circuit and a power consumed by the gate circuit during its operation; and a simulation device, configured to simulate the digital circuit based on the modified gate-level netlist.

In the method and apparatus according to the above aspects of the present invention, by adding the timing and power model of each gate circuit included in the digital circuit into the netlist, the power estimation of the digital circuit can be performed while the function verification is performed on the digital circuit, thus the function verification is seamlessly combined with the power estimation, which improves the efficiency of the digital circuit design. Furthermore, with the method and apparatus according to the above aspects of the present invention, the timing information of the digital circuit can be determined dynamically, so that the timing information is more accurate, thus the power of the digital circuit, especially the glitch power, may be determined more accurately.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
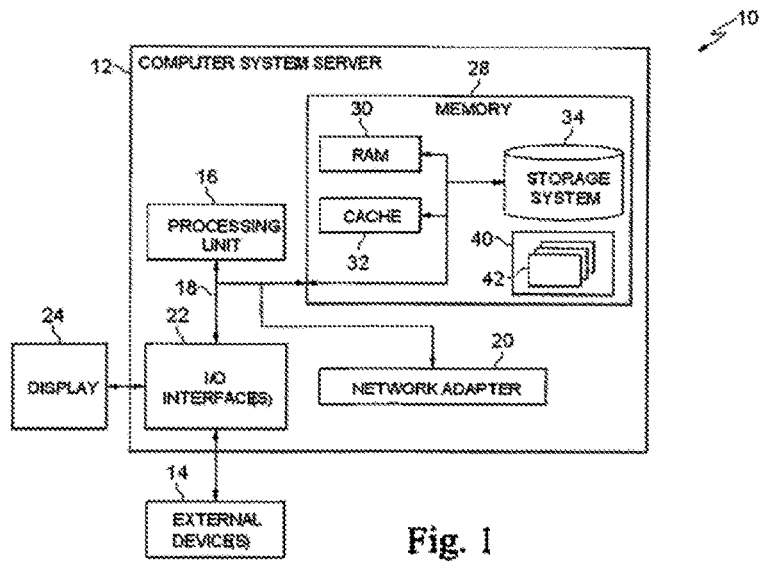
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to perform the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and apparatus for simulating a digital circuit according to embodiments of the present invention are described with reference to attached drawings.

Firstly, the method for simulating a digital circuit according to the embodiment of the present invention is described with reference to FIG. 2. This method can be used to simulate the digital circuit after a designer completes a logical design of the digital circuit, so as to perform function verification on the digital circuit and perform a power estimation of the digital circuit at the same time.

Figure 2:
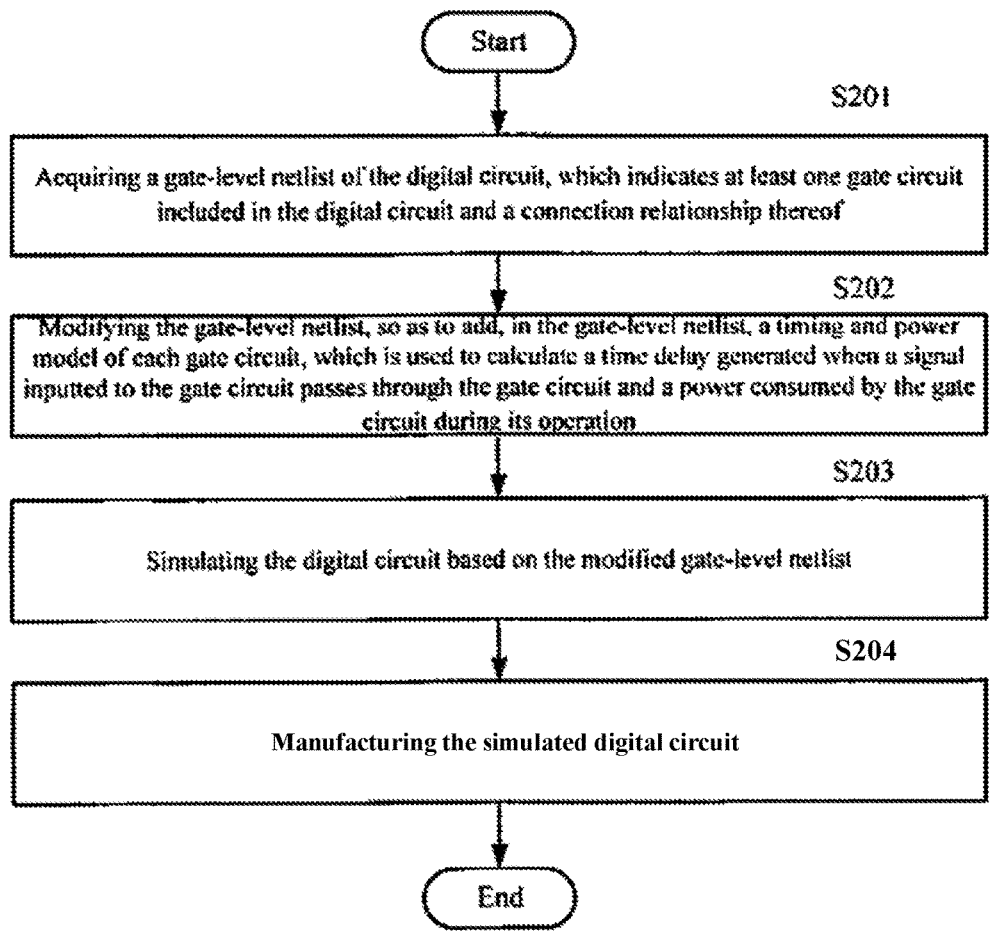
FIG. 2 shows a flowchart of a method for simulating a digital circuit according to an embodiment of the present invention.

As shown in FIG. 2, in step S201, a gate-level netlist of the digital circuit is acquired, and the gate-level netlist indicates at least one gate circuit included in the digital circuit and a connection relationship thereof.

Figure 3:
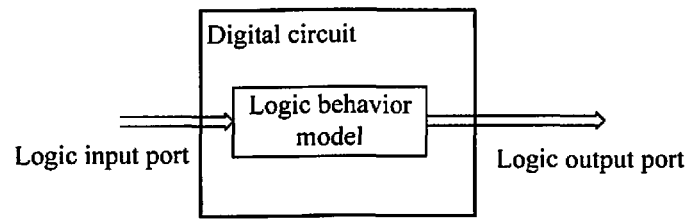
FIG. 3 shows an equivalent logical structure diagram of the digital circuit to which an unmodified gate-level netlist corresponds.

Specifically, according to a specific use of the digital circuit, the digital circuit may be one gate circuit, such as an AND gate, an OR gate, a NOT gate or the like, or may be a complicated circuit including a plurality of gate circuits, such as a register, a full adder, a static random access memory or a more complicated circuit. As known in the art, the gate-level netlist can be used to describe the digital circuit. The gate-level netlist may indicate the at least one gate circuit included in the digital circuit, e.g., indicate a type of the at least one gate circuit, thereby showing a logical relationship between an input and an output of the gate circuit (also referred to as a logical function or a logic behavior model of the gate circuit). The logic behavior model of the gate circuit can be represented as a Boolean equation. For example, for a 2-input AND gate, assuming that its two input ports are A and B and its output port is Z, the logic behavior model of the 2-input AND gate can be expressed as the Boolean equation Z=A*B. Furthermore, the gate-level netlist also indicates the connection relationship of the at least one gate circuit, for example, indicates to which gate circuits the input port and the output port of the at least one gate circuit are connected. Thereby, a logical relationship between an input and an output of the whole digital circuit (i.e., a logic behavior model of the digital circuit) may be known from the gate-level netlist. FIG. 3 illustrates an equivalent logical structure diagram of the digital circuit to which the acquired netlist (i.e., the unmodified netlist described below) correspond. As shown in FIG. 3, a signal inputted to the digital circuit via a logic input port of the digital circuit (corresponding to a real input port of the digital circuit) is subject to a logic conversion according to the logic behavior model of the digital circuit, and is outputted via a logic output port of the digital circuit (corresponding to a real output port of the digital circuit).

As a method for acquiring the gate-level netlist in step S201, the gate-level netlist of the digital circuit can be generated according to a method known in the art, or the gate-level netlist generated previously can be simply received.

Referring further to FIG. 2, the gate-level netlist is modified in step S202, so as to add, in the gate-level netlist, a timing and power model of each gate circuit for calculating a time delay generated when a signal inputted to the gate circuit passes through the gate circuit (i.e., a transmission delay of the gate circuit) and a power consumed by the gate circuit during its operation.

Figure 4:
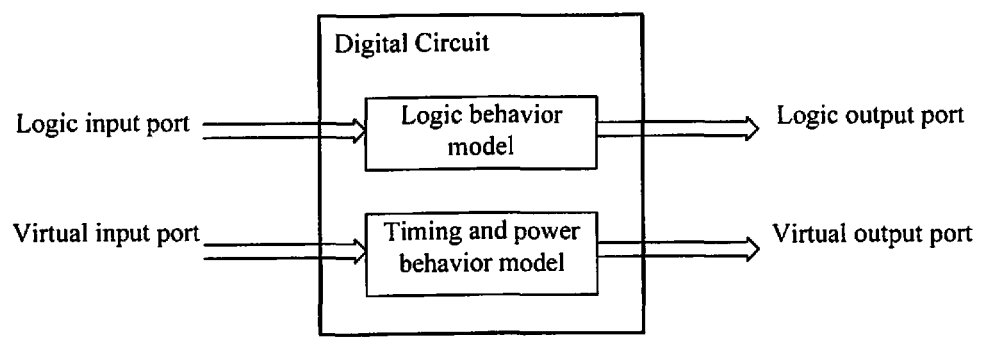
FIG. 4 shows an equivalent logical structure diagram of the digital circuit to which a modified gate-level netlist corresponds.

It can be seen that the gate-level netlist of the digital circuit acquired in step S201 does not include timing and power information of the digital circuit, so it is impossible to perform the power estimation of the digital circuit based on the gate-level netlist. To solve this problem, in the embodiment of the present invention, the gate-level netlist of the digital circuit may be modified, so as to add, in the gate-level netlist, the corresponding timing and power model for each gate circuit included in the digital circuit, and the timing and power model may be used to calculate the transmission delay of the gate circuit and the power consumed by the gate circuit during its operation. FIG. 4 illustrates an equivalent logical structure diagram of the digital circuit to which the modified gate-level netlist correspond. As shown in FIG. 4, the timing and power model is added to the diagram shown in FIG. 3 by modifying the gate-level netlist for the purpose of calculating the transmission delay and the power of the digital circuit, where the timing and power model has a virtual input port corresponding to a logic input port and a virtual output port corresponding to a logic output port.

Specifically, the timing and power model of each gate circuit may be used to calculate the transmission delay of the gate circuit according to parameters indicating characteristics of the gate circuit (i.e. intrinsic characteristics of the gate circuit per se) and parameters indicating characteristics of the signal inputted to the gate circuit, and to calculate the power consumed by the gate circuit during its operation according to the parameters indicating the characteristics of the gate circuit and the parameters indicating the characteristics of the signal inputted to the gate circuit. For example, the timing and power model of each gate circuit can define respective formulas to calculate the transmission delay and the power. In the embodiment of the present invention, the parameters indicating the characteristics of the gate circuit may include a parameter indicating a driving capability of the gate circuit, a parameter indicating a delay generated when the signal passes through wires before the respective input port of the gate circuit, and a parameter indicating a change amount of a slew of the signal passing through the wires before the respective input port. The parameters indicating the characteristics of the signal inputted to the gate circuit may include a parameter indicating a slew of the signal inputted to the respective input port of the gate circuit. The parameter indicating the driving capability of the gate circuit may be expressed by a capacitance value of a next-stage circuit that can be driven by the output of the gate circuit, and the slew refers to time taken for the signal to change from 0 to 1 or from 1 to 0.

Additionally, the timing and power model of each gate circuit may also be used to calculate a slew of an output signal of the gate circuit according to the parameters indicating the characteristics of the gate circuit and the parameters indicating the characteristics of the signal inputted to the gate circuit. For example, the timing and power model of each gate circuit may define a respective formula to calculate the slew of output signal of the gate circuit. The slew of output signal of the gate circuit is used as a slew of a signal inputted to a circuit connected downstream of the gate circuit.

The timing and power model of the gate circuit may be established in advance and stored in a file in a predetermined format (e.g., a .lib file). The parameters indicating the characteristics of the gate circuit and the three types of formulas described above will be stored in the file. Thus, for each gate circuit included in the digital circuit, the corresponding timing and power model can be acquired by reading the file, and be added into the gate-level netlist of the digital circuit. It is to be noted that specific values of the parameters indicating the characteristics of the gate circuit may be set freely by the designer depending on specific conditions of the circuit, in addition to the three types of formulas described above.

Hereinafter, the operation of modifying the gate-level netlist in step S202 is described in combination with specific examples of the digital circuit.

Figure 5:
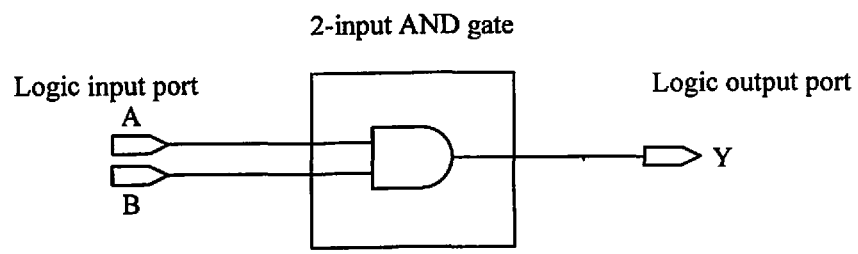
FIG. 5 shows a logical structure of 2-input AND gate as an example of a digital circuit.
Figure 6:
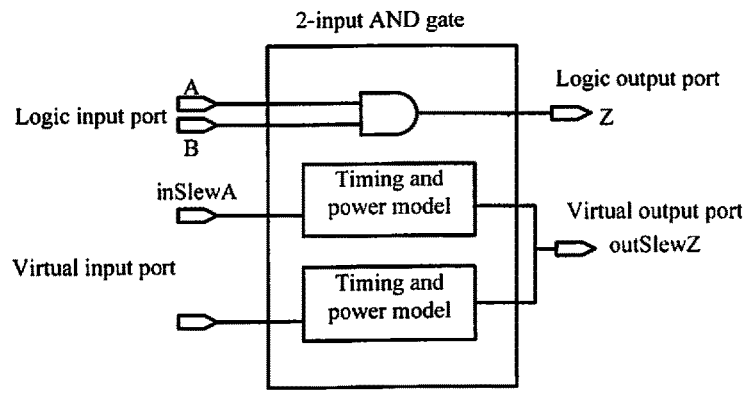
FIG. 6 shows an equivalent logical structure of the 2-input AND gate to which a modified gate-level netlist corresponds.

FIG. 5 illustrates a logical structure of a 2-input AND gate as an example of the digital circuit. The 2-input AND gate has logic input ports (real input ports) A and B and a logic output port (real output port) Z. A gate-level netlist of the 2-input AND gate may be modified by reading a file in which a timing and power model of the 2-input AND gate is stored, so as to add the timing and power model of the 2-input AND gate to the netlist. As described above, the timing and power model of the 2-input AND gate may be used, for example, by defining corresponding formulas, to calculate a transmission delay of the 2-input AND gate according to parameters indicating characteristics of the 2-input AND gate and parameters indicating characteristics of a signal inputted to the 2-input AND gate, to calculate power consumed by the 2-input AND gate during its operation according to the parameters indicating the characteristics of the 2-input AND gate and the parameters indicating the characteristics of the signal inputted to the 2-input AND gate, and further to calculate a slew of an output signal of the 2-input AND gate according to the parameters. As described above, the parameters indicating the characteristics of the 2-input AND gate may include a parameter indicating a driving capability of the 2-input AND gate (expressed as outputCapZ here, which corresponds to a capacitance value of a next-stage circuit that can be driven by the 2-input AND gate), parameters indicating delays generated when the signal passes through wires before the respective input ports A and B of the 2-input AND gate respectively (expressed as wireDelayA and wireDelayB here), and parameters indicating change amounts of slews of the signal passing through the wires before the respective input ports A and B (expressed as wireSlewDegA and wireSlewDegB here), and the parameters indicating the characteristics of the signal inputted to the 2-input AND gate include parameters indicating slews of the signal inputted to the respective input ports A and B of the 2-input AND gate (expressed as in SlewA and in SlewB here). It is to be noted that, since there is a path between each input port and the output port, the timing and power model of the gate circuit having a plurality of input ports, like the 2-input AND gate, actually include a timing and power model set for each input port, which may be used to calculate a transmission delay of the path from the input port to the output port, a slew of an output signal generated when the input port is activated, and power consumed by the digital circuit when the signal passes through the path. In other words, a corresponding timing and power model is added for each input port of the gate circuit when the gate-level netlist is modified. FIG. 6 illustrates an equivalent logical structure of the 2-input AND gate to which the modified gate-level netlist correspond. As shown in FIG. 6, a corresponding timing and power model is added for each input port of the 2-input ANG gate by modifying the gate-level netlist of the 2-input AND gate, and the two timing and power models have their respective virtual input ports (through which in SlewA and in SlewB are inputted respectively), and have a common virtual output port (through which outSlewZ is outputted).

The formula for calculating the transmission delay of the 2-input AND gate, the formula for calculating the power consumed by the 2-input AND gate during its operation and the formula for calculating the slew of the output signal of the 2-input AND gate can be set depending on specific conditions of the digital circuit, and as described above, the respective formulas can be set for each input port. In the example shown in FIG. 6, the formulas for calculating the transmission delay of the path from the input port A to the output port Z (which may be expressed as Delay), the slew of the output signal of the 2-input AND gate when the input port A is activated (which may be expressed as outSlewZ) and the power consumed by the 2-input AND gate during its operation (which may be expressed as Power) may be set for the input port A as follows:

Delay=$a1$*outputCapZ+$b1$*(inSlew$A$+wireSlewDeg$A$)+$c1$*outputCap$Z$*(inslew$A$+wireSlewDeg$A$)+$d1$+wireDelay$A$ outSlewZ=$a2$*outputCapZ+$b2$*(inSlew$A$+wireSlewDeg$A$)+$c2$*outputCap$Z$*(Inslew$A$+wireSlewDeg$A$)+$d2$+wireDelay$A$ Power=$a3$*outputCapZ+$b3$*(inSlew$A$+wireSlewDeg$A$)+$c3$*outputCap$Z$*(Inslew$A$+wireSlewDeg$A$)+$d3$.

where coefficients a1-a3, b1-b3, c1-c3 and d1-d3 can be flexibly set according to actual needs. For example, a1, b1, c1 and d1 may be set to 1.4, 0.2, 0.1 and 0.1 respectively, a2, b2, c2 and d2 may be set to 1.5, 0.1, 0.2 and 0.2 respectively, and a3, b3, and d3, may be set to 15.2, 1.7, 0.2 and 1.1 respectively. Alternatively, a1-a3, b1-b3, c1-c3 and d1-d3 may be set to other values.

Similarly, for the input port B, the formulas for calculating the transmission delay of the path from the input port B to the output port Z (which may be expressed as Delay), the slew of the output signal of the 2-input AND gate when the input port B is activated (which may be expressed as outSlewZ) and the power consumed by the 2-input AND gate during its operation (which may be expressed as Power) may be set for the input port B as follows:

Delay=$a4$*outputCapZ+$b4$*(inSlew$B$+wireSlewDeg$B$)+$c4$*outputCap$Z$*(Inslew$B$+wireSlewDeg$B$)+$d4$+wireDelay$B$.

outSlewZ=$a5$*outputCapZ+$b5$*(inSlew$B$+wireSlewDeg$B$)+$c5$*outputCap$Z$*(Inslew$B$+wireSlewDeg$B$)+$d5$+wireDelay$B$ Power=$a6$*outputCapZ+$b6$*(inSlew$B$+wireSlewDeg$B$)+$c6$*outputCap$Z$*(Inslew$B$+wireSlewDeg$B$)+$d6$.

where coefficients a4-a6, b4-b6, c4-c6 and d4-d6 can be flexibly set according to actual needs. For example, a4, b4, c4, d4 may be set to 1.3, 0.3, 0.2 and 0.1 respectively, a5, b5, c5 and d5 may be set to 1.4, 0.2, 0.1 and 0.3 respectively, and a6, b6, c6 and d6 may be set to 15.1, 1.8, 0.2 and 1.2 respectively. Alternatively, a4-a6, b4-b6, c4-c6 and d4-d6 may be set to other values.

Thus, an exemplary gate-level netlist of the 2-input AND gate shown below can be acquired by the modification operation in step S202:

[Exemplary gate-level netlist]

```
timescale 1ns/1ps
module AND2 (Z, A, B, inSlewA, inSlewB, outSlewZ);
  parameter outputCapZ = 0.0; // the parameters are initialized during
initialization of the netlist
  parameter wireDelayA = 0.0;
  parameter wireDelayB = 0.0;
  parameter wireSlewDegA = 0.0;
  parameter wireSlewDegB = 0.0;
  // the logic input ports and the logic output port of 2-input AND gate
  input A, B; output Z;
  //the virtual input ports and the virtual output port of the timing and
power model real inSlewA, inSlewB, outSlewZ;
  always @(A)
  begin
    if (A=='1') then
        //When a rising edge appears in the signal at the input port A,
the port is activated
        Delay=a1*outputCapZ+b1*(inSlewA+wireSlewDegA)
            +c1*outputCapZ*(InslewA+wireSlewDegA)+d1+wireDelayA
        outSlewZ=a2*outputCapZ+b2*(inSlewA+wireSlewDegA)
            +c2*outputCapZ*(InslewA+wireSlewDegA)+d2+wireDelayA
        Power=a3*outputCapZ+b3*(inSlewA+wireSlewDegA)
            +c3*outputCapZ*(InslewA+wireSlewDegA)+d3;
    else
        // Falling edge
        ...
        end;
  end;
  always @(B)
  begin
    if (B=='1') then
        // When a rising edge appears in the signal at the input port B, the
port is activated
        Delay=a4*outputCapZ+b4*(inSlewB+wireSlewDegB)
            +c4*outputCapZ*(InslewB+wireSlewDegB)+d4+wireDelayB
        outSlewZ=a5*outputCapZ+b5*(inSlewB+wireSlewDegB)
            +c5*outputCapZ*(InslewB+wireSlewDegB)+d5+wireDelayB
        Power=a6*outputCapZ+b6*(inSlewB+wireSlewDegB)
            +c6*outputCapZ*(InslewB+wireSlewDegB)+d6;
    else
        // Falling edge
        ...
    end
    Z = A & B after Delay
endmodule;
```

It is to be noted that in the case where a timing and power model is set for each input port, if the input port A is activated at a certain moment, the transmission delay, the slew of the output signal and the power are calculated according to the formulas set for the input port A, and if the input port B is activated, the transmission delay, the slew of output signal and the power are calculated according to the formulas set for the input port B. However, if both the input ports A and B are activated, the transmission delay and the slew of the output signal calculated according to the formulas set for the input port A or the transmission delay and the slew of the output signal calculated according to the formulas set for the input port B may be selected according to a predetermined criteria, as the transmission delay and the slew of the output signal of the 2-input AND gate, and a sum of the power calculated according to the formula set for the input port A and the power calculated according to the formula set for the input port B may be calculated as the power of the 2-input AND gate.

Figure 7:
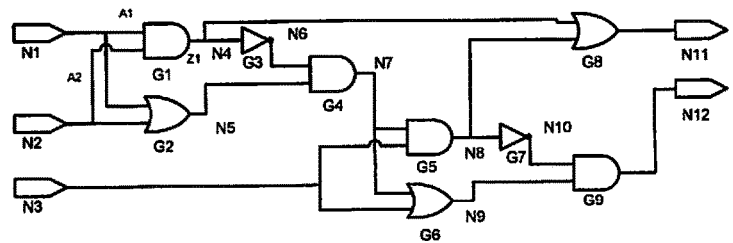
FIG. 7 shows a logical structure of a full adder as an example of a more complicated digital circuit.
Figure 8:
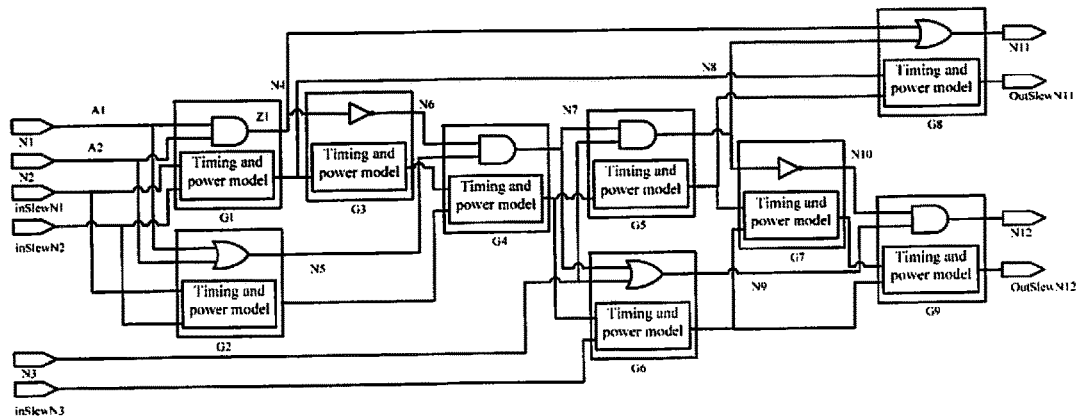
FIG. 8 shows an equivalent logical structure of the full adder to which a modified gate-level netlist corresponds.

For a more complicated digital circuit containing a plurality of gate circuits, a gate-level netlist thereof may be modified similarly. FIG. 7 illustrates a logical structure of a full adder as an example of the more complex digital circuit. The full adder includes three logic input ports N1-N3, two logic output ports N11 and N12, and a plurality of gate circuits (AND gate, OR gate and NOT gate), and connection relationships the gate circuits are shown in FIG. 7. The gate-level netlist of the full adder may be modified according to the method described above, so that a corresponding timing and power model is added for each gate circuit included in the full adder, as shown in FIG. 8, and the timing and power model added for each gate circuit can be used to calculate a transmission delay of the gate circuit, a slew of an output signal of the gate circuit, and power consumed by the gate circuit. It is to be noted that the timing and power models added for the respective input ports of the gate circuit are shown as one model in FIG. 8 just for simplicity.

Thus, the modified gate-level netlist of the digital circuit may describe the logic behavior model and the timing and power model of each gate circuit in the digital circuit.

Returning to FIG. 2, in step S203, the digital circuit is simulated based on the modified gate-level netlist, and in step S204, the simulated digital circuit is manufactured.

Specifically, an excitation signal may be inputted to the digital circuit to activate the digital circuit. Then, a signal waveform of the output signal of the digital circuit generated in response to the excitation signal is calculated according to the logical relationship between the input and the output (logic behavior model) of the respective gate circuit included in the gate-level netlist. The method for calculating the signal waveform of the output signal based on the logic behavior model of the gate circuit is known in the art, and a description thereof is omitted here.

Additionally, a power waveform of the output signal can be calculated according to the timing and power model of the respective gate circuit included in the gate-level netlist. During the simulation, the calculation of the power waveform and the power calculation of the signal waveform can be performed simultaneously or sequentially.

For the digital circuit including only one gate circuit, when the excitation signal is inputted via a certain input port, the excitation signal is logically converted in the gate circuit, and then is outputted via the output port of the digital circuit after the time delay (Delay). Since the modified netlist contains the logic behavior model of the gate circuit, the output waveform of the gate circuit may be determined according to the logic behavior model. Since the slew of the excitation signal is known, the time delay (Delay) and the power (Power) described above can be determined from the modified netlist, thereby the power waveform of the digital circuit can be determined.

For the complicated digital circuit including a plurality of gate circuits, the transmission delays, the slews of the output signals and the powers of the respective gate circuits can be calculated sequentially, thereby the transmission delay, the slew of the output signal and the power of the entire digital circuit can be determined. For instance, for the full adder as shown in FIG. 8, an excitation signal may be applied to an input port N1 of the full adder. When a rising edge appears in the excitation signal, a 2-input AND gate G1 in the full adder is activated, a path of the excitation signal from an input port A1 to an output port Z1 is activated, thereby the always @A module in the modified netlist of the 2-input AND gate described above is activated. Thereby, a transmission delay generated when the excitation signal passes through the 2-input AND gate G1, a slew of an output signal of the 2-input AND gate G1 and a power consumed by 2-input AND gate G1 may be calculated in the manner described above. Since an output of the 2-input AND gate G1 is connected to an inverter G3, the slew of the output signal of the 2-input AND gate G1 becomes a slew of an input signal of the inverter G3. Subsequently, a transmission delay of the inverter G3, a slew of an output signal of the inverter G3 and a power of the inverter G3 may be calculated according to a timing and time power model of the inverter G3 similarly. In turn, the slew of the output signal of the inverter G3 becomes a slew of a signal inputted to a circuit downstream of the inverter G3, and subsequently, a transmission delay of the downstream circuit, a slew of an output signal of the downstream circuit and a power of the downstream circuit may be calculated based on a timing and time power model of the downstream circuit. In this way, a transmission delay, a slew of an output signal and a power of each gate circuit which the signal passes through can be calculated sequentially in a signal transmission direction. A power consumed by the digital circuit at each moment and a total power consumed by the digital circuit may be calculated by adding the powers consumed by the respective gate circuits at each moment, so that the power waveform of the digital circuit can be obtained.

It can be seen that, with the above simulation method according to the embodiment of the present invention, the power of the designed digital circuit may be estimated while the function verification is performed on the digital circuit, thereby seamlessly combining the function verification with the power estimation, which improves an efficiency of the digital circuit design. Furthermore, with the above simulation method, it is not necessary to determine the timing information of the digital circuit in advance and read the SDF file, instead, the transmission delay and the slew of the output signal of each gate circuit may be determined dynamically according to specific conditions of the excitation signal and each gate circuit, thereby making it possible to calculate the glitch power which is closely related to the timing information accurately.

Hereinafter, an apparatus for simulating a digital circuit according to an embodiment of the present invention will be described with reference to FIG. 9. The apparatus can execute the method for simulating a digital circuit described above. Since details of operations executed by respective components of the apparatus are substantially the same as the respective steps of the method for simulating a digital circuit according to the embodiment of the present invention described above, descriptions of the same details are omitted here, and only a brief description of the apparatus is provided here.

Figure 9:
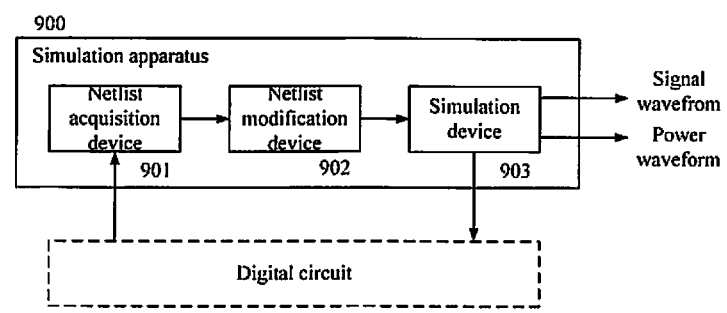
FIG. 9 shows a block diagram of an apparatus for simulating a digital circuit according to an embodiment of the present invention.

As shown in FIG. 9, the apparatus 91 for simulating a digital circuit according to the embodiment of the present invention comprises a netlist acquisition device 911, a netlist modification device 912 and a simulation device 913.

The netlist acquisition device 911 can acquire a gate-level netlist of the digital circuit, which indicates at least one gate circuit included in the digital circuit and a connection relationship thereof. As mentioned above, the netlist acquisition device 911 can generate the gate-level netlist of the digital circuit by itself, or may receive the gate-level netlist of the digital circuit generated in advance from outside to acquire the gate-level netlist. The gate-level netlist is the same as the netlist described above with reference to FIG. 2, and will not be described here.

The netlist modification device 912 can modify the gate-level netlist, so as to add a timing and power model of each gate circuit into the gate-level netlist, where the timing and power model is used to calculate a time delay generated when a signal inputted to the gate circuit passes through the gate circuit and a power consumed by the gate circuit during its operation.

Specifically, since the gate-level netlist of the digital circuit acquired by the netlist acquisition device 911 does not include timing and power information of the digital circuit, the gate-level netlist of the digital circuit can be modified to add the corresponding timing and power model for each gate circuit included in the digital circuit into the gate-level netlist, in order to estimate the power of the digital circuit. The timing and power model can be used to calculate the transmission delay of the gate circuit and the power consumed by the gate circuit during its operation.

Specifically, the timing and power model of each gate circuit can be used to calculate the transmission delay of the gate circuit according to parameters indicating characteristics of the gate circuit (i.e. intrinsic characteristics of the gate circuit per se) and parameters indicating characteristics of the signals inputted to the gate circuit, and to calculate the power consumed by the gate circuit during its operation according to the parameters indicating the characteristics of the gate circuit and the parameters indicating the characteristics of the signal inputted to the gate circuit. For example, the timing and power model of each gate circuit can define corresponding formulas to calculate the transmission delay and the power. In the embodiment of the present invention, the parameters indicating the characteristics of the gate circuit may include a parameter indicating a driving capability of the gate circuit, a parameter indicating a delay generated when the signal passes through wires before the respective input port of the gate circuit, and a parameter indicating a change amount of a slew of the signal passing through the wires before the respective input port. The parameters indicating the characteristics of the signal inputted to the gate circuit may include a parameter indicating a slew of the signal inputted to the respective input port of the gate circuit. Additionally, the timing and power model of each gate circuit may also be used to calculate a slew of an output signal of the gate circuit according to the parameters indicating the characteristics of the gate circuit and the parameters indicating the characteristics of the signal inputted to the gate circuit. Likewise, the timing and power model of each gate circuit may define a corresponding formula to calculate the slew of the output signal of the gate circuit. The slew of the output signal of the gate circuit acts as a slew of a signal inputted to a circuit connected downstream of the gate circuit.

The netlist modification device 912 may read a file in a predetermined format (e.g., a .lib file) where timing and power models of various gate circuits are stored in advance, and then add a corresponding timing and power model for the respective gate circuit into the gate-level netlist according to the read timing and power model.

The simulation device 913 receives the modified gate-level netlist from the netlist modification device 912, and simulates the digital circuit based on the modified gate-level netlist.

Specifically, an excitation signal may be inputted to the digital circuit to activate the digital circuit. Then, the simulation device 913 may calculate a signal waveform of the output signal of the digital circuit generated in response to the excitation signal according to a logical relationship between the input and the output (logic behavior model) of the respective gate circuit included in the gate-level netlist. Furthermore, the simulation device 913 can further calculate a power waveform of the output signal based on the timing and power model of the respective gate circuit included in the gate-level netlist. During the simulation, the calculation of the power waveform and the calculation of the signal waveform can be performed simultaneously or sequentially. The specific manner of performing the simulation by the simulation device 913 is the same as that described above with reference to FIG. 2, and a description thereof is omitted here.

It can be seen that, with the above simulation apparatus according to the embodiment of the present invention, the power of the designed digital circuit may be estimated while the function verification is performed on the digital circuit, thereby seamlessly combining the function verification with the power estimation, which improves an efficiency of the digital circuit design. Furthermore, the simulation apparatus may determine the transmission delay and the slew of the output signal of each gate circuit dynamically according to specific conditions of the excitation signal and each gate circuit, thereby makes it possible to calculate the glitch power which is closely related to the timing information accurately.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for simulating and manufacturing a digital circuit, comprising:
acquiring a gate-level netlist of the digital circuit, which indicates at least one gate circuit included in the digital circuit and a connection relationship thereof;
modifying the gate-level netlist, so as to add, in the gate-level netlist, a timing and power model of each gate circuit, which is used to calculate a time delay generated when a signal inputted to the gate circuit passes through the gate circuit and a power consumed by the gate circuit during its operation;
simulating the digital circuit based on the modified gate-level netlist;
determining whether or not a power consumed by the simulated digital circuit exceeds a predetermined threshold;

in response to determining that the power consumed by the simulated digital circuit exceeds the predetermined threshold, modifying a design of the simulated digital circuit; and in response to determining that the power consumed by the simulated digital circuit does not exceed the predetermined threshold, manufacturing the simulated digital circuit, wherein:
the simulating the digital circuit comprises performing a function verification and a power estimation,
timing information of the digital circuit is not determined in advance of the simulating the digital circuit, and
the simulating the digital circuit is performed without using a standard delay format file.

2. The method of claim 1, wherein the timing and power model of each gate circuit is used to calculate the time delay generated when the signal inputted to the gate circuit passes through the gate circuit and the power consumed by the gate circuit during its operation according to parameters indicating characteristics of the gate circuit and parameters indicating characteristics of the signal inputted to the gate circuit.

3. The method of claim 2, wherein the parameters indicating the characteristics of the gate circuit include a parameter indicating a driving capability of the gate circuit, a parameter indicating a delay generated when the signal passes through wires before the respective input port of the gate circuit and a parameter indicating a change amount of a slew of the signal passing through the wires before the respective input port, and the parameters indicating the characteristics of the signal inputted to the gate circuit include a parameter indicating a slew of the signal inputted to the respective input port of the gate circuit.

4. The method of claim 3, wherein the timing and power model of each gate circuit is further used to calculate a slew of an output signal of the gate circuit according to the parameters indicating the characteristics of the gate circuit and the parameters indicating the characteristics of the signal inputted to the gate circuit, the slew of the output signal of the gate circuit acting as a slew of a signal inputted to a circuit downstream of the gate circuit.

5. The method of claim 1, wherein the timing and power model of each gate circuit is stored in a file in a predetermined format in advance.

6. The method of claim 1, wherein the simulating the digital circuit based on the modified gate-level netlist further comprises:
inputting an excitation signal to the digital circuit;
performing the function verification by calculating a signal waveform of an output signal of the digital circuit generated in response to the excitation signal, according to a logical relationship between an input and an output of the respective gate circuit included in the gate-level netlist; and
performing the power estimation by calculating a power waveform of the output signal according to the timing and power model of the respective gate circuit included in the gate-level netlist.

7. An apparatus for simulating and manufacturing a digital circuit using a computer software package, the apparatus comprising:
a hardware processor, a computer readable memory, and a computer readable storage medium; and
the computer software package comprising:

first program instructions of a netlist acquirer configured to acquire a gate-level netlist of the digital circuit, which indicates at least one gate circuit included in the digital circuit and a connection relationship thereof;
second program instructions of a netlist modifier configured to modify the gate-level netlist, so as to add, in the gate-level netlist, a timing and power model of each gate circuit, which is used to calculate a time delay generated when a signal inputted to the gate circuit passes through the gate circuit and a power consumed by the gate circuit during its operation;
third program instructions of a simulator configured to simulate the digital circuit based on the modified gate-level netlist; and
fourth program instructions to:
determine whether or not a power consumed by the digital circuit simulated by the simulator exceeds a predetermined threshold;
in response to determining that the power consumed by the digital circuit simulated by the simulator exceeds the predetermined threshold, modify a design of the digital circuit simulated by the simulator; and
in response to determining that the power consumed by the digital circuit simulated by the simulator does not exceed the predetermined threshold, manufacture the digital circuit simulated by the simulator,
wherein:
the simulator is configured to simulate the digital circuit by performing a function verification and a power estimation,
timing information of the digital circuit is not determined in advance of the simulator simulating the digital circuit,
the simulator is configured to simulate the digital circuit without using a standard delay format file, and
the first program instructions, the second program instructions, the third program instructions, and the fourth program instructions are stored on the computer readable storage medium for execution by the hardware processor via the computer readable memory.

8. The apparatus of claim 7, wherein the timing and power model of each gate circuit is used to calculate the time delay generated when the signal inputted to the gate circuit passes through the gate circuit and the power consumed by the gate circuit during its operation according to parameters indicating characteristics of the gate circuit and parameters indicating characteristics of the signal inputted to the gate circuit.

9. The apparatus of claim 8, wherein the parameters indicating the characteristics of the gate circuit include a parameter indicating a driving capability of the gate circuit, a parameter indicating a delay generated when the signal passes through wires before the respective input port of the gate circuit and a parameter indicating a change amount of a slew of the signal passing through the wires before the respective input port, and the parameters indicating the characteristics of the signal inputted to the gate circuit include a parameter indicating a slew of the signal inputted to the respective input port of the gate circuit.

10. The apparatus of claim 9, wherein the timing and power model of each gate circuit is further used to calculate a slew of an output signal of the gate circuit according to the parameters indicating the characteristics of the gate circuit and the parameters indicating the characteristics of the signal inputted to the gate circuit, the slew of the output signal of the gate circuit acting as a slew of a signal inputted to a circuit downstream of the gate circuit.

11. The apparatus of claim 7, wherein the timing and power model of each gate circuit is stored in a file in a predetermined format in advance.

12. The apparatus of claim 7, wherein during simulating the digital circuit based on the modified gate-level netlist, the simulator inputs an excitation signal to the digital circuit, calculates a signal waveform of an output signal of the digital circuit generated in response to the excitation signal, according to a logical relationship between an input and an output of the respective gate circuit included in the gate-level netlist, and calculates a power waveform of the output signal according to the timing and power model of the respective gate circuit included in the gate-level netlist.

13. The method of claim 1, wherein the time delay is determined dynamically during the simulating the digital circuit.

14. The method of claim 1, wherein a slew of an output signal is determined dynamically during the simulating the digital circuit.

15. The method of claim 1, wherein a transmission delay and a slew of an output signal of each gate circuit is dynamically determined according to an excitation signal and the gate circuit.

16. The method of claim 15, wherein a glitch power is determined based on the dynamically determined transmission delay and the dynamically determined slew.

* * * * *